United States Patent [19]

Zawislak

[11] 3,992,033
[45] Nov. 16, 1976

[54] COLLAPSIBLE LUGGAGE CARRIER
[75] Inventor: Phyllis D. Zawislak, Huntington, N.Y.
[73] Assignee: The Raymond Lee Organization, Inc., New York, N.Y.
[22] Filed: Oct. 14, 1975
[21] Appl. No.: 621,705

Related U.S. Application Data
[63] Continuation-in-part of Ser. No. 506,823, Sept. 17, 1974, abandoned.

[52] U.S. Cl. .............................................. 280/651
[51] Int. Cl.² ............................................. B62B 3/04
[58] Field of Search .......... 280/651, 652, 639, 641, 280/43.16

[56] References Cited
UNITED STATES PATENTS

| | | | |
|---|---|---|---|
| 320,587 | 6/1885 | Rathknecht | 280/43.16 |
| 1,203,194 | 10/1916 | Haege | 280/641 |
| 1,887,134 | 11/1932 | Johancen | 280/43.16 |
| 2,383,340 | 8/1945 | Pezzano | 280/43.16 |
| 3,633,932 | 1/1972 | Holden | 280/651 |
| 3,729,209 | 4/1973 | Litz | 280/651 |

Primary Examiner—Robert R. Song
Attorney, Agent, or Firm—Howard I. Podell

[57] ABSTRACT

A collapsible wheeled luggage carrier on which baggage may be transported in a terminal. The luggage carrier comprises an L-shaped platform with holding strap mounted to a collapsible handle and wheeled frame assembly, fastened in front of a raised L-shaped back platform.

3 Claims, 4 Drawing Figures

COLLAPSIBLE LUGGAGE CARRIER

This is a continuation-in-part of Ser. No. 506,823, filed Sept. 17, 1974 now abandoned.

SUMMARY OF THE INVENTION

My invention relates to a wheeled collapsible luggage carrier that may be used for the transportation of luggage and packages in a terminal. The luggage carrier comprises an L-shaped platform with a strap for securing the packages to the platform. A pair of wheels are affixed to the base of the platform and a third wheel is fixed to a support bracket pivotably mounted to the back of the platform. A collapsible handle assembly is also pivotably mounted to the back of the platform.

An advantage of my invention is that it provides a luggage carrier capable of being folded for compact storage.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
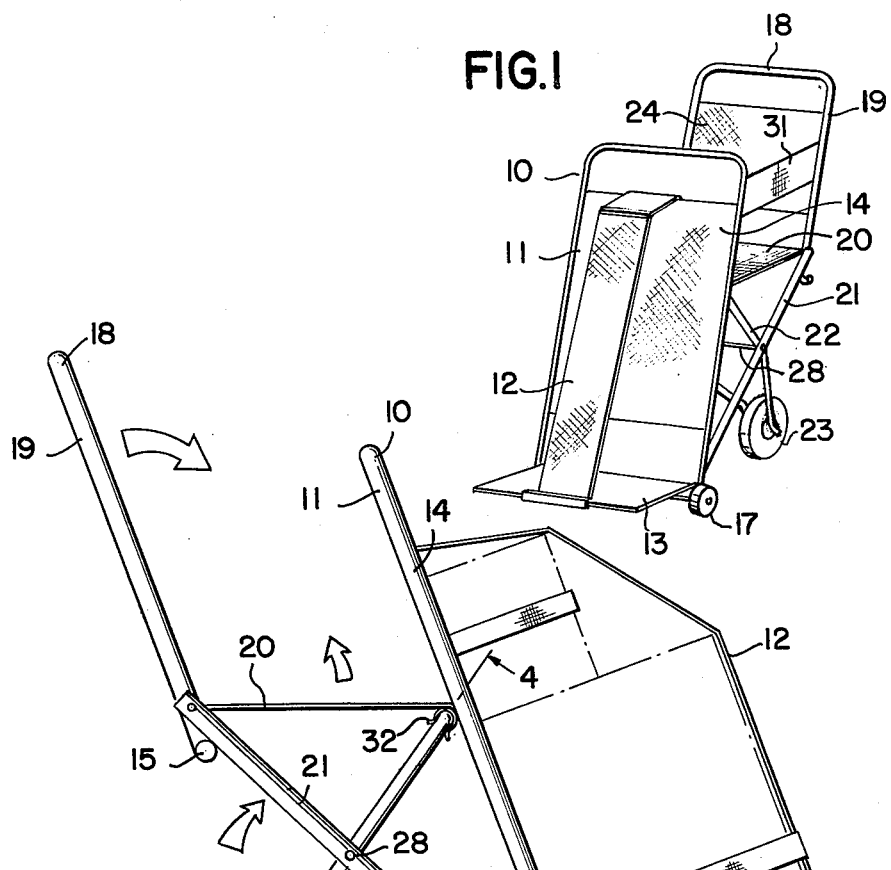
FIG. 1 illustrates a perspective view of the invention.
Figure 2:
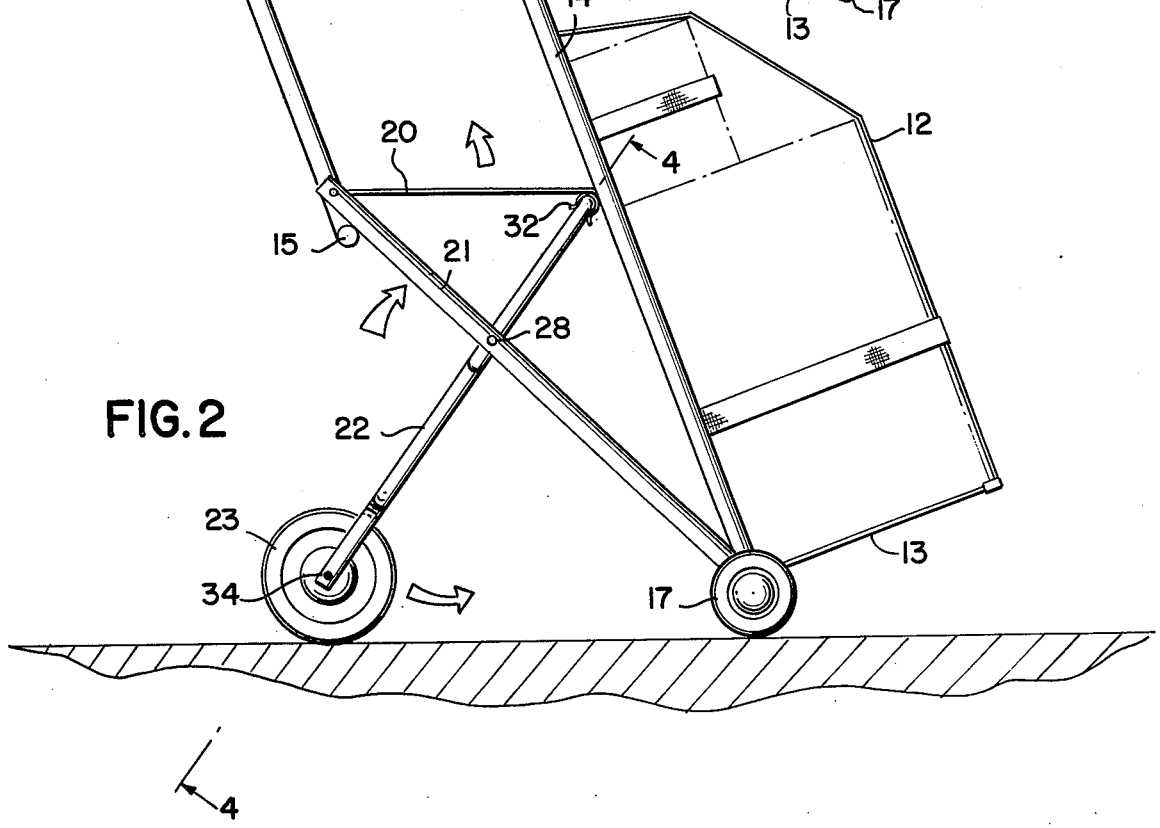
FIG. 2 illustrates a side view of the invention in use.

Turning now descriptively to the drawings, in which similar reference characters denote similar elements throughout the several views, FIGS. 1–2 show the assembled collapsible wheeled luggage carrier 10 used for the transportation of luggage and packages. The carrying platform 13 for the luggage carrier 10 is the base of an L-shaped member 11 of sufficient width to accommodate bags or packages, with the back member 14 of the carrying platform in the shape of a rectangular frame, joined at its bottom to the rectangular base member 13 which is supported by the axle 16 and a pair of wheels 17. A flat flexible strap 12 is fixed at one end to the back member 14 and at the other end to the base member 13 of the carrying platform 11 to hold packages fast.

A handle member 18 is formed of a wire frame 19 that is rotatably joined to a horizontal back spacer shelf 20 and to two spaced parallel frame members 21, with the other end of spacer shelf 20 resting against the rear of the back member 14 of the carrying platform and on top of a continuous shaped frame member 22 that is clipped to the rear of back member 14 and pivotably fastened by pin 28 to each frame member 21. Luggage may be placed on spacer shelf 20 in the assembled condition of the device 10, being held in place by a back member 24 fastened to wire frame 19.

The frame members 21 are each rotatably joined to the axle 16 of the front wheels 17 and the bottom of each end of shaped frame member 22 is rotatably joined to a rear wheel 23 by axle 34.

Figure 3:
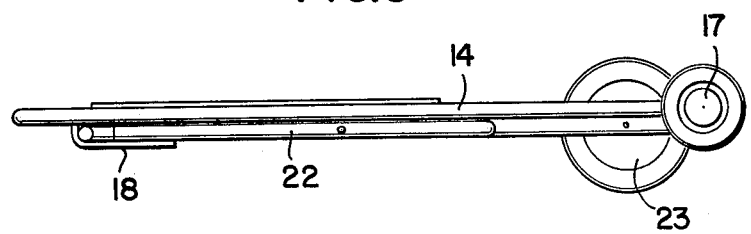
FIG. 3 illustrates a side view of the invention in a collapsed position.
Figure 4:
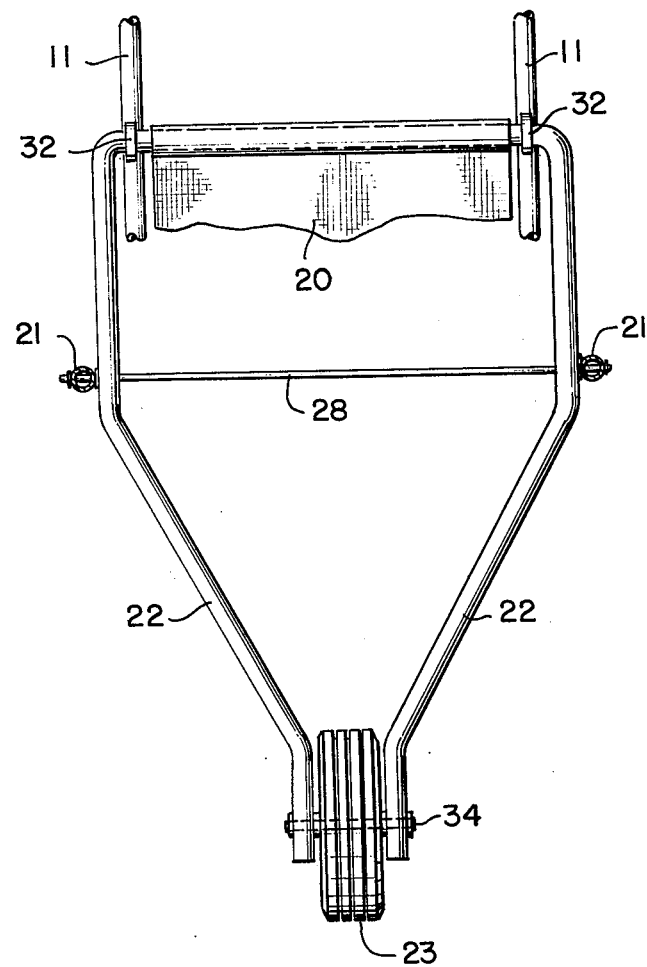
FIG. 4 illustrates a sectional view taken along line 4—4 of FIG. 2.

A stop 15 is fastened to the lower end of handle frame 19 to limit rearwards rotation of the handle frame 19 in the assembled condition, but to permit handle frame 19 to be rotated forwards when folding the device 10 to the folded flat position, as shown in FIG. 3.

A flexible strap 31 may join each side of handle frame 19 to the side of the frame of the back member 14 of the luggage platform 11 to retain packages resting on the spacer shelf 20.

To fold the device 10 for storage, continuous shaped frame member 22 is unfastened from clip 32 on the back member 14, and the handle frame 19 rotated, collapsing the frame members 21 and 22. Base 13 of the luggage carrier platform 11 folds parallel to back member 14.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A foldable wheeled luggage carrier that in the erected state is formed of
    a horizontally inclined luggage platform extending forward of the lower section of the carrier,
    a first back upright member pivotably mounted to the rear of the said luggage platform,
    a horizontal shelf, the front of which is detachably mounted to the rear of the mid-section of the said first back upright member and pivotably mounted at its rear to
    a second back upright member extending upwards from the rear of the horizontal shelf, with the top of the second back upright member serving as a handle for moving the carrier on
    a pair of front wheels mounted to an axle joined to the rear of the underside of the luggage platform and
    a third wheel rotatably mounted to the lower ends of
    a support frame that is pivotably joined at its upper end in a detachable manner to a clip on the rear of the mid-section of the first back upright member, with the mid-sections of the said support frame pivotably joined to the mid-sections of
    a pair of rods, one mounted on each side of the unit, with the lower end of each said rod arm pivotably joined to the axle of the front wheels and the upper end of each rod rotatably joined to a side of the lower section of second back upright member, such that
    detaching of the upper end of the support frame from the clip on the rear of first back upright member and detaching of the front of the shelf from its mounting to the back of said first back upright member enables the members of the carrier to fold to form a compact package, when not in use.

2. The combination as recited in claim 1 in which a flexible strap is fitted from the first back upright member to the front of the luggage platform for retention of a package on the luggage platform, against the said back upright member.

3. The combination as recited in claim 1 in which a flexible strap is fitted on each side of the shelf member, each said strap being fastened at one end to a side of the first back upright member, and at the other end of each strap to a side of the second back upright member.

* * * * *